(12) United States Patent
Albasheir et al.

(10) Patent No.: US 10,362,619 B2
(45) Date of Patent: Jul. 23, 2019

(54) UE INITIATED SERVICE-DRIVEN END-TO-END BEARER DATA PATH MODIFICATION

(71) Applicant: Telefonaktiebolaget LM Ericsson (publ), Stockholm (SE)

(72) Inventors: Suliman Albasheir, Issaquah, WA (US); Jad El-Najjar, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 263 days.

(21) Appl. No.: 15/515,931

(22) PCT Filed: Oct. 1, 2014

(86) PCT No.: PCT/IB2014/065005
§ 371 (c)(1),
(2) Date: Mar. 30, 2017

(87) PCT Pub. No.: WO2016/051236
PCT Pub. Date: Apr. 7, 2016

(65) Prior Publication Data
US 2017/0251421 A1    Aug. 31, 2017

(51) Int. Cl.
*H04W 76/22* (2018.01)
*H04L 12/801* (2013.01)
(Continued)

(52) U.S. Cl.
CPC ............. *H04W 76/22* (2018.02); *H04L 47/18* (2013.01); *H04W 40/04* (2013.01); *H04W 40/12* (2013.01);
(Continued)

(58) Field of Classification Search
None
See application file for complete search history.

(56) References Cited

U.S. PATENT DOCUMENTS

| 7,693,093 | B2 | 4/2010 | Riedel et al. |
| 8,578,035 | B2 | 11/2013 | Miklós et al. |
| 2010/0075677 | A1 | 3/2010 | Wang et al. |

(Continued)

FOREIGN PATENT DOCUMENTS

| WO | 9952307 A1 | 10/1999 |
| WO | 0141376 A2 | 6/2001 |

(Continued)

*Primary Examiner* — Otis L Thompson, Jr.
(74) *Attorney, Agent, or Firm* — Sage Patent Group

(57) ABSTRACT

According to an aspect, an existing end-to-end bearer data path of communication between a wireless device and an endpoint in a core network is modified. The wireless device receives parametric information identifying respective service capabilities of network nodes in the core network that are available for forming alternate end-to-end bearer data paths of communication between the wireless device and the endpoint. The parametric information is used to determine that a more favorable end-to-end bearer data path of communication between the wireless device and the endpoint is available. The more favorable end-to-end bearer data path has a more favorable service capability in the core network as compared to the existing end-to-end bearer data path. The wireless device requests a path modification from the existing end-to-end bearer data path to the more favorable end-to-end bearer data path.

24 Claims, 14 Drawing Sheets

(51) Int. Cl.
  *H04W 40/04* (2009.01)
  *H04W 40/12* (2009.01)
  *H04W 40/24* (2009.01)
  *H04W 40/34* (2009.01)
  *H04W 84/04* (2009.01)
  *H04W 88/16* (2009.01)

(52) U.S. Cl.
  CPC ......... *H04W 40/248* (2013.01); *H04W 40/34* (2013.01); *H04W 84/042* (2013.01); *H04W 88/16* (2013.01)

(56) References Cited

U.S. PATENT DOCUMENTS

| | | | | |
|---|---|---|---|---|
| 2011/0141890 A1* | 6/2011 | Giaretta | ................ | H04W 28/20 370/232 |
| 2011/0199969 A1* | 8/2011 | Yang | .................... | H04W 76/12 370/328 |
| 2012/0147767 A1* | 6/2012 | Yang | ................. | H04W 36/0044 370/252 |
| 2012/0170547 A1 | 7/2012 | Oprescu-Surcobe et al. | | |
| 2012/0230289 A1 | 9/2012 | Olsson et al. | | |
| 2013/0286821 A1* | 10/2013 | Liu | ....................... | H04W 88/16 370/225 |
| 2014/0029536 A1* | 1/2014 | Tian | .................... | H04W 72/087 370/329 |
| 2014/0198637 A1* | 7/2014 | Shan | ................... | H04W 52/243 370/229 |
| 2014/0219248 A1* | 8/2014 | Reddiboyana | ........ | H04W 76/15 370/331 |
| 2015/0172983 A1* | 6/2015 | Randriamasy | ...... | H04W 36/165 370/331 |
| 2015/0249999 A1* | 9/2015 | Kaippallimalil | ...... | H04W 24/08 370/329 |
| 2018/0368038 A1* | 12/2018 | Reddiboyana | ........ | H04W 76/15 |
| 2019/0014550 A1* | 1/2019 | Rommer | ................. | H04L 41/12 |

FOREIGN PATENT DOCUMENTS

| | | |
|---|---|---|
| WO | 2013156981 A1 | 10/2013 |
| WO | 2014036334 A2 | 3/2014 |

* cited by examiner

400

```
┌─────────────────────────────────────────┐
│ RECEIVE PARAMETRIC INFORMATION IDENTIFYING │
│ RESPECTIVE SERVICE CAPABILITIES OF NETWORK │
│ NODES IN THE CORE NETWORK THAT ARE AVAILABLE │
│ FOR FORMING ALTERNATE END-TO-END BEARER DATA │
│ PATHS OF COMMUNICATION BETWEEN THE WIRELESS │
│ DEVICE AND THE ENDPOINT                 │
│ 402                                     │
└─────────────────────────────────────────┘
                    │
                    ▼
┌─────────────────────────────────────────┐
│ DETERMINE FROM THE PARAMETRIC INFORMATION │
│ THAT A MORE FAVORABLE END-TO-END BEARER DATA │
│ PATH OF COMMUNICATION BETWEEN THE WIRELESS │
│ DEVICE AND THE ENDPOINT IS AVAILABLE, SAID MORE │
│ FAVORABLE END-TO-END BEARER DATA PATH HAVING │
│ A MORE FAVORABLE SERVICE CAPABILITY IN THE │
│ CORE NETWORK AS COMPARED TO THE EXISTING END- │
│ TO-END BEARER DATA PATH                 │
│ 404                                     │
└─────────────────────────────────────────┘
                    │
                    ▼
┌─────────────────────────────────────────┐
│ REQUEST A PATH MODIFICATION IN THE CORE │
│ NETWORK FROM THE EXISTING END-TO-END BEARER │
│ DATA PATH TO THE MORE FAVORABLE END-TO-END │
│ BEARER DATA PATH                        │
│ 406                                     │
└─────────────────────────────────────────┘
```

SEND, BY THE NETWORK NODE TO A WIRELESS DEVICE, PARAMETRIC INFORMATION IDENTIFYING RESPECTIVE SERVICE CAPABILITIES OF NETWORK NODES IN THE CORE NETWORK THAT ARE AVAILABLE FOR FORMING ONE OR MORE ALTERNATE END-TO-END BEARER DATA PATHS OF COMMUNICATION BETWEEN THE WIRELESS DEVICE AND AN ENDPOINT IN THE CORE NETWORK
602

RECEIVE A REQUEST, FROM THE WIRELESS DEVICE, FOR A PATH RECONFIGURATION OF THE EXISTING END-TO-END BEARER DATA PATH, WHEREIN THE REQUEST COMPRISES INFORMATION CORRESPONDING TO AN ALTERNATE END-TO-END BEARER DATA PATH HAVING A MORE FAVORABLE SERVICE CAPABILITY IN THE CORE NETWORK AS COMPARED TO THE EXISTING END-TO-END BEARER DATA PATH
604

REQUEST THE PATH MODIFICATION IN THE CORE NETWORK OF THE EXISTING END-TO-END BEARER DATA PATH BASED ON THE REQUEST FROM THE WIRELESS DEVICE
606

*FIG. 6*

1100

DISTRIBUTE, BY A PLURALITY OF NETWORK NODES THAT ARE AVAILABLE FOR FORMING ALTERNATE END-TO-END BEARER DATA PATHS OF COMMUNICATION BETWEEN THE WIRELESS DEVICE AND THE ENDPOINT, PARAMETRIC INFORMATION IDENTIFYING RESPECTIVE SERVICE CAPABILITIES OF NETWORK NODES IN THE CORE NETWORK
1102

DETERMINE, BY THE WIRELESS DEVICE, FROM THE PARAMETRIC INFORMATION THAT A MORE FAVORABLE END-TO-END BEARER DATA PATH OF COMMUNICATION BETWEEN THE WIRELESS DEVICE AND THE ENDPOINT IS AVAILABLE, SAID MORE FAVORABLE END-TO-END BEARER DATA PATH HAVING A MORE FAVORABLE SERVICE CAPABILITY IN THE CORE NETWORK AS COMPARED TO THE EXISTING END-TO-END BEARER DATA PATH
1104

REQUEST, BY THE WIRELESS DEVICE, A PATH MODIFICATION IN THE CORE NETWORK FROM THE EXISTING END-TO-END BEARER DATA PATH TO THE MORE FAVORABLE END-TO-END BEARER DATA PATH
1106

MODIFY THE EXISTING END-TO-END BEARER DATA PATH BASED ON THE MORE FAVORABLE END-TO-END BEARER DATA PATH
1108

*FIG. 11*

UE INITIATED SERVICE-DRIVEN END-TO-END BEARER DATA PATH MODIFICATION

TECHNICAL FIELD

This disclosure generally relates to wireless communication networks, and particularly relates to modification of an end-to-end bearer data path.

BACKGROUND

The data connection provided by a wireless communication network to a wireless device generally comprises multiple segments or links between the collection of core network and radio network nodes being used to support the connection. For example, in LTE, a Packet Data Network Gateway, PGW, provides connectivity between a User Equipment, UE, and an external Packet Data Network, PDN, and the end-to-end bearer data path between the PGW and the UE has at least three distinct segments: a radio bearer between the UE and its serving base station (eNodeB), a data bearer between the eNodeB and the Serving Gateway, SGW, (referred to as an "S1" bearer), and a data bearer between the serving SGW and the PGW (referred to as an "S5" bearer).

In conventional networks, a network and/or the wireless device may initiate a change in the radio bearer based on an evaluation of relative signal qualities between the wireless device and its current serving base station and one or more neighboring base stations that are candidates for serving the wireless device. It is recognized herein that a conventional base station handover based on signal strength fails to consider the relative capabilities of the core network nodes supporting the existing data path of the wireless device, as compared to corresponding other network nodes that are available for use in forming an alternate data path that may or may not involve changing radio bearers and/or base stations. While conventional handover may provide or maintain the Quality of Service, QoS, experienced by a given wireless device based on handing it over to a base station offering improved radio signal quality, such handover does not consider the relative capabilities of network nodes upstream from the new base station. That is, while the handover may provide the wireless device with a better radio link, it does not weigh or otherwise evaluate the capabilities of any upstream nodes involved in the handover. Furthermore, it is recognized herein that wireless devices generally are blind to differences in the service capabilities between nodes in the core network.

SUMMARY

Embodiments described herein include methods and devices for modifying an existing end-to-end bearer data path of communication between a wireless device and an endpoint in a core network based on a more favorable end-to-end bearer data path having a more favorable service capability in the core network as compared to the existing end-to-end bearer data path.

According to some embodiments, a method by a wireless device of modifying an existing end-to-end bearer data path of communication between the wireless device and an endpoint in a core network is provided. The method includes receiving parametric information identifying respective service capabilities of network nodes in the core network that are available for forming alternate end-to-end bearer data paths of communication between the wireless device and the endpoint. The method also includes determining from the parametric information that a more favorable end-to-end bearer data path of communication between the wireless device and the endpoint is available. The more favorable end-to-end bearer data path has a more favorable service capability in the core network as compared to the existing end-to-end bearer data path. In some cases, the more favorable end-to-end bearer data path involves one or more network nodes in the core network having a more favorable service capability as compared to corresponding network nodes in the existing end-to-end bearer data path. The method further includes requesting a path modification to change from the existing end-to-end bearer data path to the more favorable end-to-end bearer data path.

According to some embodiments, a method of modifying an existing end-to-end bearer data path of communication between a wireless device and an endpoint in a core network includes sending, by a network node to the wireless device, parametric information identifying respective service capabilities of network nodes in the core network that are available for forming alternate end-to-end bearer data paths of communication between the wireless device and the endpoint. The method also includes receiving a request, from the wireless device, for a path modification of the existing end-to-end bearer data path. The request includes information corresponding to an alternate end-to-end bearer data path having a more favorable service capability as compared to the existing end-to-end bearer data path. The method further includes requesting the path modification of the existing end-to-end bearer data path based on the request from the wireless device.

According to some embodiments, a wireless device is configured to modify an end-to-end bearer data path of communication between the wireless device and an endpoint in a core network. The wireless device includes a transceiver circuit configured to transmit and receive wireless signals and a processing circuit operatively connected to the transceiver circuit. The processing circuit is configured to receive parametric information identifying respective service capabilities of network nodes in the core network that are available for forming one or more alternate end-to-end bearer data paths of communication between the wireless device and the endpoint. The processing circuit is also configured to determine from the parametric information that a more favorable end-to-end bearer data path of communication between the wireless device and the endpoint is available. The more favorable end-to-end bearer data path has a more favorable service capability in the core network as compared to the existing end-to-end bearer data path. The processing circuit is also configured to request a path modification from the existing end-to-end bearer data path to the more favorable end-to-end bearer data path.

According to some embodiments, a network node configured to modify an existing end-to-end bearer data path of communication between a wireless device and an endpoint in a core network includes a processing circuit configured to send parametric information identifying respective service capabilities of network nodes in the core network that are available for forming alternate end-to-end bearer data paths of communication between the wireless device and the endpoint. The processing circuit is also configured to receive a request, from the wireless device, for a path modification of the existing end-to-end bearer data path. The request includes information corresponding to an alternate end-to-end bearer data path having a more favorable service capability in the core network as compared to the existing end-to-end bearer data path. The processing circuit is also configured to request the path modification in the core network of the existing end-to-end bearer data path based on the request from the wireless device.

According to some embodiments, a method of modifying an existing end-to-end bearer data path of communication between a wireless device and an endpoint in a core network includes distributing, by a plurality of network nodes that are available for forming alternate end-to-end bearer data paths of communication between the wireless device and the endpoint, parametric information. The parametric information identifies respective service capabilities of network nodes in the core network. The method also includes determining, by the wireless device, from the parametric information that a more favorable end-to-end bearer data path of communication between the wireless device and the endpoint is available. The more favorable end-to-end bearer data path has a more favorable service capability in the network as compared to the existing end-to-end bearer data path. The method further includes requesting, by the wireless device, a path modification from the existing end-to-end bearer data path to the more favorable end-to-end bearer data path. The method also includes modifying the existing end-to-end bearer data path in the core network based on the more favorable end-to-end bearer data path.

According to some embodiments, a communication system configured to modify an existing end-to-end bearer data path of communication between a wireless device and an endpoint in a core network includes network nodes that are available for forming alternate end-to-end bearer data paths of communication between the wireless device and the endpoint. The network nodes are configured to distribute parametric information identifying respective service capabilities of network nodes in the core network to other network nodes. The network nodes are configured to modify the existing end-to-end bearer data path in the core network based on a more favorable end-to-end bearer data path. The wireless device is configured to receive the parametric information and determine from the parametric information that the more favorable end-to-end bearer data path of communication between the wireless device and the endpoint is available. A more favorable end-to-end bearer data path has a more favorable service capability in the core network as compared to the existing end-to-end bearer data path. The wireless device is configured to request the path modification to change from the existing end-to-end bearer data path to the more favorable end-to-end bearer data path.

According to some embodiments, a non-transitory computer readable storage medium stores a computer program for modifying an existing end-to-end bearer data path of communication between a wireless device and an endpoint in a core network. The computer program comprises program instructions that, when executed on at least one processor of a wireless device, configures the wireless device to receive parametric information identifying respective service capabilities of network nodes in the core network that are available for forming alternate end-to-end bearer data paths of communication between the wireless device and the endpoint. The program instructions cause the processor to determine from the parametric information that a more favorable end-to-end bearer data path of communication between the wireless device and the endpoint is available. The more favorable end-to-end bearer data path has a more favorable service capability in the network as compared to the existing end-to-end bearer data path. The program instructions cause the processor to request a path modification in the core network from the existing end-to-end bearer data path to the more favorable end-to-end bearer data path.

According to some embodiments, a non-transitory computer readable storage medium stores a computer program for modifying an existing end-to-end bearer data path of communication between a wireless device and an endpoint in a core network. The computer program comprises program instructions that, when executed on at least one processor of a wireless device, configures the wireless device to send parametric information identifying respective service capabilities of network nodes in the core network that are available for forming alternate end-to-end bearer data paths of communication between the wireless device and the endpoint. The program instructions cause the processor to receive a request, from the wireless device, for a path modification of the existing end-to-end bearer data path. The request includes information corresponding to an alternate end-to-end bearer data path having a more favorable service capability in the core network as compared to the existing end-to-end bearer data path. The program instructions cause the processor to request the path modification of the existing end-to-end bearer data path based on the request from the wireless device.

According to some embodiments, a wireless device, which is configured to modify an existing end-to-end bearer data path of communication between the wireless device and an endpoint in a core network, at least functionally includes a receiving module configured to receive parametric information identifying respective service capabilities of network nodes in the core network that are available for forming alternate end-to-end bearer data paths of communication between the wireless device and the endpoint. The wireless device also includes a determining module configured to determine from the parametric information that a more favorable end-to-end bearer data path of communication between the wireless device and the endpoint is available. The more favorable end-to-end bearer data path has a more favorable service capability in the network as compared to the existing end-to-end bearer data path. Still further, the wireless device includes a requesting module configured to request a path modification from the existing end-to-end bearer data path to the more favorable end-to-end bearer data path.

According to some embodiments, a network node, which is configured to modify an existing end-to-end bearer data path of communication between a wireless device and an endpoint in a core network, at least functionally includes a sending module configured to send parametric information identifying respective service capabilities of network nodes in the core network that are available for forming alternate end-to-end bearer data paths of communication between the wireless device and the endpoint. The example network node also includes a receiving module configured to receive a request, from the wireless device, for a path modification of the existing end-to-end bearer data path. The request includes information corresponding to an alternate end-to-end bearer data path having a more favorable service capability in the core network as compared to the existing end-to-end bearer data path. Still further, the example network node includes a requesting module configured to request the path modification of the existing end-to-end bearer data path based on the request from the wireless device.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 4 is a flowchart illustrating a method by a wireless device for requesting modification of an end-to-end bearer data path of communication, according to some embodiments.

FIG. 6 is a flowchart illustrating a method by a network node for modifying an end-to-end bearer data path of communication, according to some embodiments.

FIG. 11 is a flowchart illustrating a method, by a network communication system, of modifying an end-to-end bearer data path of communication between a wireless device and an endpoint in a core network, according to some embodiments.

DETAILED DESCRIPTION

Figure 1:
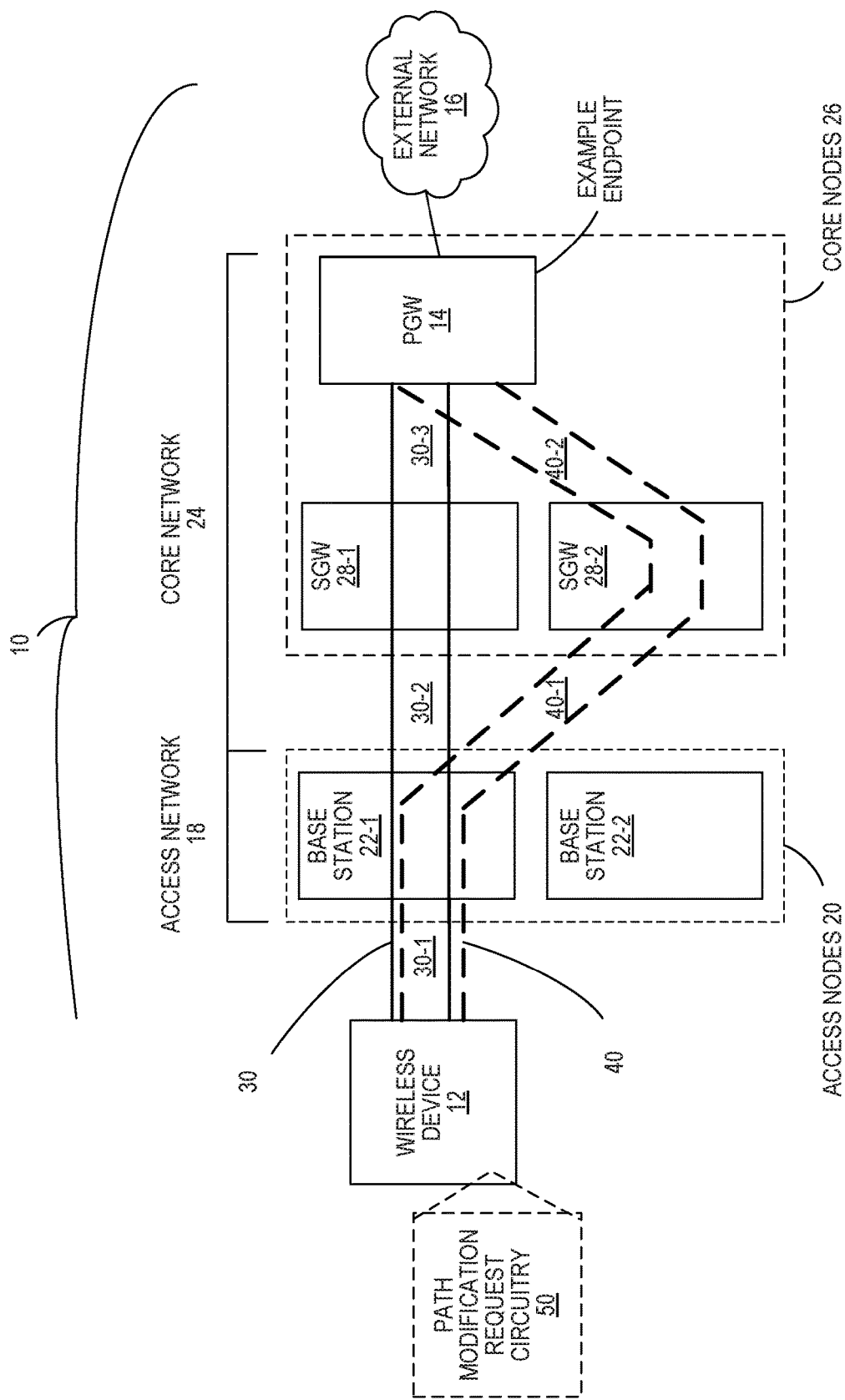
FIG. 1 is a block diagram of a communication network including a wireless device configured to request modification of an end-to-end bearer data path of communication between the wireless device and an endpoint in a core network based on a more favorable end-to-end bearer data path, according to some embodiments.

FIG. 1 is a block diagram of a communication network 10 including a wireless device 12 that is in communication with an endpoint 14 in a core network 24 that includes a number of core network nodes 26, which may include multiple types or hierarchies of nodes. Communications are supported by an existing end-to-end, E2E, bearer data path 30 that is formed through or supported by a particular one or ones of the core network nodes.

In the non-limiting example of FIG. 1, the communication network 10 may be an LTE network and the wireless device 12 may be a user equipment or UE. The existing E2E bearer data path 30 in this example may include: a bearer data path segment 30-1 between the wireless device 12 and a base station 22-1 (e.g., eNodeB) in the access network 18; a bearer data path segment 30-2 between the base station 22-1 and a Serving Gateway, SGW, 28-1 in the core network 24; and a bearer data path segment 30-3 between the SGW 28-1 and a Packet Data Network Gateway, PGW, 14.

The PGW 14 is one example of a network node that may be treated as an "endpoint" in the core network 24 for purposes of considering alternate end-to-end bearer data paths. However, other network types may have other types of nodes that function as endpoints within the sense meant in this disclosure. That is, while the PGW 14 is one example of an endpoint, that example holds for 4G/LTE networks, but in 2G, 3G, 5G or other network implementations, other nodes can be the endpoint or gateway to the external network(s).

Further, even in the context of the illustrated example, the endpoint may be logically considered to exist at, e.g., the SGW level. For example, the current SGW 28 associated with an existing end-to-end bearer data path 30 can be considered as being an endpoint for that path 30. A modification to the existing end-to-end bearer data path 30, e.g., selecting a more favorable end-to-end bearer data path, may entail selecting a different SGW 28, which is an example of a path change that changes path endpoints. Of course, path changes do not necessarily change path endpoints. For example, the same SGW 28 and/or PGW 14 may be considered as the endpoint for the existing bearer data path 30 and any one or more of the alternate bearer data paths that may be formed between the wireless device 12 and that same endpoint.

This same logic holds for different configurations or implementations of the involved core network. For example, for a core network that includes multiple hierarchies of nodes or multiple instances of the same node types, the endpoint for a given path modification may be regarded as existing at the highest level of hierarchy or at some lower level. Put simply, modifying an existing bearer data path 30 as contemplated herein may or may not entail changing the existing path endpoint, but generally will involve changing one or more core network nodes making up the path.

To that end, the example wireless device 12 includes path modification request circuitry 50 that is configured to cause the wireless device 12 to request modification of the existing E2E bearer data path 30 based on a more favorable alternate E2E bearer data path 40. The wireless device 12 receives parametric information identifying respective service capabilities of network nodes in the core network 24, such as core nodes 26 SGW 28-1, SGW 28-2 and PGW 14, which are available for forming one or more alternate E2E bearer data paths of communication between the wireless device 12 and the endpoint 14. The wireless device 12 may also receive parametric information for the access nodes 20 of the access network 18, such as for the base stations 22-1 and 22-2.

The wireless device 12 determines from the parametric information that a more favorable E2E bearer data path 40 of communication between the wireless device and the endpoint is available in the core network 24. The more favorable E2E bearer data path 40 has a more favorable service capability in the core network 24 as compared to the existing E2E bearer data path 30. In this example, the bearer data path 40-1 from the base station 22-1 to the SGW 28-2 and the bearer data path 40-2 from the SGW 28-2 to the PGW 14 are determined to be more favorable based on the parametric information indicating that the SGW 28-2 provides a more favorable service capability in the core network 24 than the current SGW 28-1. This may include a service capability not available to the current SGW 28-1 or a better ability to handle the service that wireless device 12 is using.

The wireless device 12 requests a path modification from the existing E2E bearer data path 30 to the more favorable E2E bearer data path 40. The base station 22-1 may receive this request and request modification of the E2E data bearer path in the core network 24.

Parametric information may include service capability information about network nodes that are capable of providing bearers that handle a number of services. Such services may include providing a QoS at a base station 22 and treating traffic based on a QoS Class Indicator, QCI, traffic types and/or qualities. Services may also consider whether there is support for Internet Protocol version 4, IPv4, or Internet Protocol version 6, IPv6. Services may include support for Jumbo frame, Multimedia Broadcast Multicast Service for LTE, eMBMS, or other services. In various embodiments, parametric information may be considered distinct from status information, including status information such as eNodeB power strength, network node load and network node bandwidth congestion. The wireless device 12 may evaluate both parametric information and status information in determining and comparing alternate E2E bearer data paths.

This parametric information may be sent periodically from a base station 22 to the wireless device 12, such as from a currently attached base station 22-1, based on information received from the core network 24 and from neighboring base stations 22-2. In the LTE example, eNodeBs may share parametric information via the X2 interface. In some cases, the wireless device 12 may send a base station 22 a request for parametric information. Parametric information may also be asynchronously or periodically distributed to wireless devices.

A new protocol may be used to achieve network awareness at the base stations 22 for specifying bearer capability, in some embodiments. This new protocol may be referred to as Network Awareness Protocol, NAP. Parametric information may be generated, sent and/or received in a format defined according to the NAP protocol.

Figure 2:
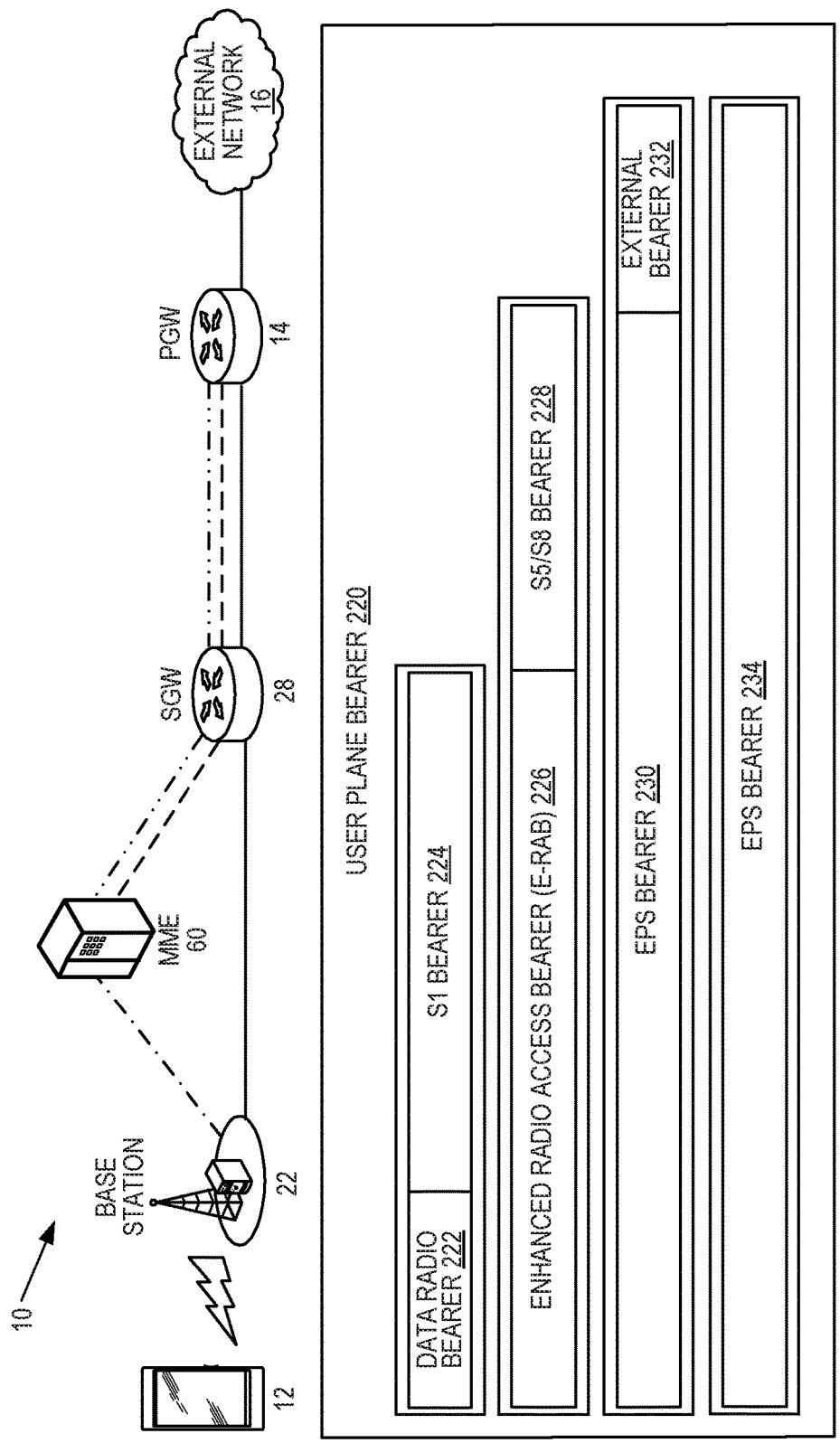
FIG. 2 is a diagram illustrating bearers included in an end-to-end bearer data path in the communication network, according to some embodiments.

The communication network 10 of FIG. 1 is described further with the illustration of FIG. 2. FIG. 2 shows the communication network 10 as an LTE network. LTE network architecture is divided into two parts: the EPC, Evolved Packet Core, and the Evolved-Universal Terrestrial Radio Access Network, E-UTRAN. The EPC consists mainly of the SGW 28 and the Mobility Management Entity MME 60, whereas the E-UTRAN contains mainly the base stations 22, such as LTE eNodeBs, E-UTRAN NodeB. An eNodeB may also be referred to as DUL, or Digital Unit LTE. The LTE eNodeB provides the air interface to the wireless device 12 or other types of user devices, which are broadly referred to as UEs. The eNodeB is responsible for radio transmission to and reception from UEs in one or more cells. In this example, a single element may be representative of multiple corresponding elements.

The SGW 28 is a data plane GW that manages user-plane mobility between the Radio Access Network, RAN, and core networks. A given SGW 28 maintains data paths between base stations 22 (eNodeBs) and the Packet Data Network Gateway, PGW, 14. From a functional perspective, the SGW 28 is the termination point of the packet data network interface towards the E-UTRAN. The SGW 28 routes and forwards the user packet data from the wireless device 12 to the PGW 14 or from the PGW 14 to the wireless device 12. The SGW 28 acts as a local mobility anchor for the user plane during inter-eNodeB handovers and provides charging functionality.

The E-UTRAN may also include SIU, or Site Integration Unit, nodes. A given eNodeB connects to its neighbor eNodeBs by means of the X2 interface and to supporting EPC nodes (respectively the SGW 28 and the MME 60) via the SIU for both User Plane, UP, and Control Plane, CP, data transfer. The SIU acts as an interface between the EPC core transport network and one or more LTE eNodeBs. The SIU may be referred to as the parent of the LTE eNodeBs, and the LTE eNodeBs may be considered children of the SIU.

The SIU can be placed in central positions, strategically located to all LTE eNodeBs connected to it. The SIU can support the following main functions: aggregate all traffic from its LTE eNodeBs children sites to a single Wide Area Network, WAN, interface; site router functionality with support of configurable static routes to forward traffic between different Internet Protocol, IP, interfaces created in the system; Quality of Service, QoS, on the WAN interface for outbound traffic (eight queues are implemented in the SIU for the outgoing traffic in the WAN interface); and E1/T1 interfaces and Ethernet interfaces on the SIU for incoming and outgoing traffic.

The bearers of the communication network 10 are also shown in FIG. 2, according to some embodiments. User plane bearer 220 includes a data radio bearer 222 that provides service between the wireless device 12 and base station 22. An S1 bearer 224 provides service between the base station 22 and the SGW 28. Note that the LTE network has an S1 interface that acts as the connectivity interface between the E-UTRAN and the EPC network for both CP and UP traffic. The S1-MME interface provides support for functionality such as paging, handover, UE context management, E-RAB management and transparent transport of messages between MME and UE. Protocols used on this interface are S1-AP (MME & eNB) and NAS (UE & MME). The S1-U is the user plane interface carrying user data traffic between the base station 22 and the SGW 28 received from the wireless device 12. GTP-U is the protocol used on this interface.

The MME 60 may assist in coordinating this bearer service. The MME 60 is part of the EPC core network and it handles CP messages from the E-UTRAN nodes. It keeps track of UEs moving around within the MME's service area. It handles NAS, or Non-Access Stratum, signaling, including security (integrity protection and ciphering). An Enhanced Radio Access Bearer, E-RAB, 226 provides service between the wireless device 12 and the SGW 28. An S5/S8 bearer 228 provides service between the SGW 28 and the PGW 14. An Evolved Packet System, EPS, Bearer 230 provides service between the wireless device 12 and the PGW 14. An external bearer 232 provides service between the PGW 14 and the external network 16. Another EPS bearer 234 provides service between the wireless device 12 and the external network 16. Bearer path modification may include modifying any of a number of bearers, including the S1 bearer 224, the E-RAB bearer 226, the S5/S8 bearer 228, the EPS bearer 230, or EPS bearer 234.

Figure 3:
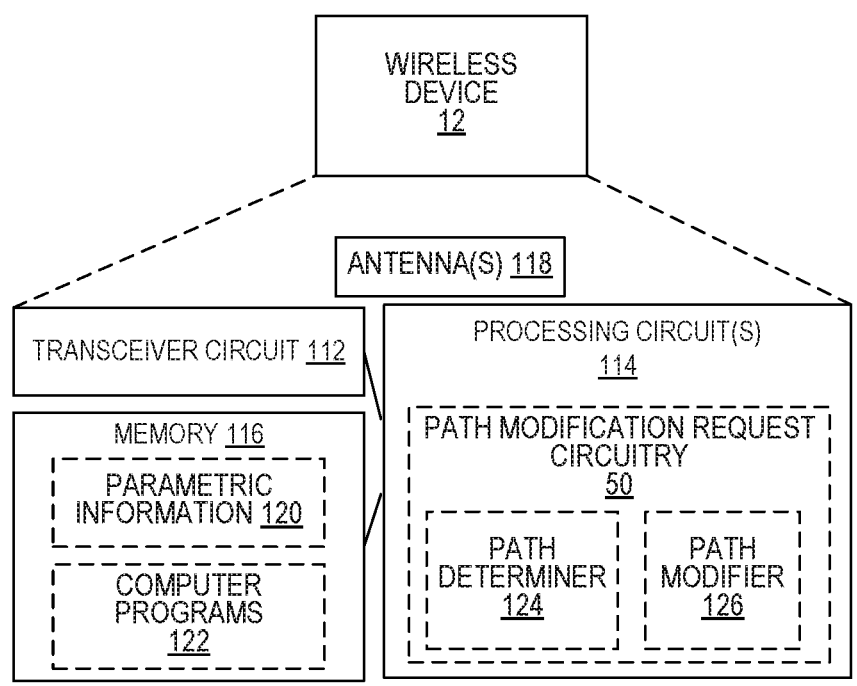
FIG. 3 is a block diagram of a wireless device configured to request modification of an end-to-end bearer data path of communication between a wireless device and an endpoint in a core network, according to some embodiments.

FIG. 3 shows a diagram of the wireless device 12, according to some embodiments. The wireless device 12 may have an air interface that includes one or more antennas 118 connected to a transceiver circuit 112. The transceiver circuit 112 includes transmitter circuits, receiver circuits, and associated control circuits that are collectively configured to transmit and receive signals according to a radio access technology such as GSM, WCDMA, HSDPA, LTE, LTE-Advanced, etc., for the purposes of providing cellular communication services.

The wireless device 12 may include one or more processing circuits 114 that are operatively associated with the radio transceiver circuit 112. According to some embodiments, the processing circuit 114 includes path modification request circuitry 50 that determines more favorable E2E bearer data paths and request modification of an existing E2E bearer data path. Path modification request circuitry includes a path determiner circuit 124 and a path modifier circuit 126. The path determiner circuit 124 determines a more favorable E2E bearer data path based on parametric information about service capabilities of network nodes and/or bearers of the core network 24. The path modifier circuit 126 requests modification of the path based on the determination.

The path determiner circuit 124 may be configured to receive and evaluate parametric information about the network and determine alternate E2E bearer data paths. The path determiner circuit 124 may determine a more favorable E2E bearer data path 40. A more favorable path provides better service capability in the core network 24 than a capability of a current E2E bearer data path 30. For example, a more favorable path includes certain core nodes 26 that can provide a service capability that other core nodes 26 cannot. A more favorable path is selected by the path determiner circuit 124. In another example, parametric information about the service capabilities of certain network nodes of the core nodes 26 are determined to be superior or more available than the service capabilities of the network nodes of the core nodes 26 in the existing E2E bearer data path 30. This alternate path 40 is selected by the path determiner circuit 124.

The path modifier circuit 126 sends a request for modification of the existing E2E bearer data path 30. This request may result in changing a core node 26 in the bearer path 30, such as changing bearer path 30-2 towards the SGW 28-1 to bearer path 40-1 towards the SGW 28-2. The next bearer path to the PGW 14 would then change from the current bearer path 30-3 to the alternate bearer path 40-2.

The processing circuit 114 in this example is also associated with a memory 116. The memory 116, in some embodiments, stores one or more computer programs 122 and, optionally, configuration data. The memory 116 stores parametric information 120. The memory 116 provides non-transitory storage for the computer program 122 and it may comprise disk storage, solid-state memory storage, or any mix thereof. By way of non-limiting example, the memory comprises any one or more of SRAM, DRAM, EEPROM, and FLASH memory. In general, the memory 116 comprises one or more types of computer-readable storage media providing non-transitory storage of the computer program 122 and any configuration data used by the wireless device 12. In turn, in at least some embodiments, the processing circuit 114 is configured to carry out smart E2E bearer data path modification as taught herein, based, at least in part, on the execution of computer program instructions.

In at least some embodiments, the processing circuit 114 comprises one or more digital processing circuits, e.g., one or more microprocessors, microcontrollers, Digital Signal Processors or DSPs, Field Programmable Gate Arrays of FPGAs, Complex Programmable Logic Devices or CPLDs, Application Specific Integrated Circuits or ASICs, or any mix thereof. More generally, the processing circuit 114 may comprise fixed, non-programmable circuitry, or programmable circuitry that is specially adapted via the execution of program instructions implementing the functionality taught herein, or may comprise some mix of fixed and programmed circuitry.

Regardless of its specific implementation details, the processing circuit 114 of the wireless device 12 is configured to perform a method, such as method 400 of FIG. 4, for modification of the E2E data path. The processing circuit 114 is configured to receive parametric information identifying respective service capabilities of a plurality of network nodes in the core network 24 that are available for forming one or more alternate E2E bearer data paths of communication between a wireless device 12, and an endpoint, such as the PGW 14 (block 402 of FIG. 4). The processing circuit 114 is also configured to determine from the parametric information that a more favorable E2E bearer data path 40 of communication between the wireless device 12 and the PGW 14 is available (block 404). The more favorable E2E bearer data path 40 has a more favorable service capability as compared to the existing E2E bearer data path 30. The processing circuit 114 is configured to request a path modification from the existing E2E bearer data path 30 to the more favorable E2E bearer data path 40 (block 406). This modification may include a reconfiguration of the participating core nodes 26 and/or service bearers involving the core nodes 26.

According to some embodiments, in determining a more favorable path, the wireless device 12 may evaluate parametric information and prioritize, based on its own current capacity needs (e.g., QoS, jumbo frame, etc.), the most efficient E2E paths to be used for bearer modification/reallocation. The wireless device 12 may then select from its current active bearers the ones that are to be modified/reallocated based on the most efficient E2E bearer paths it has determined. This dynamic procedure may take place upon request or periodically based on current traffic flow experienced in the E2E network.

Various embodiments described herein provide a smart E2E Bearer Data Path Modification, which is driven not by solely power measurements or network status, but by the service capabilities available in the network. For example, the wireless device 12 may benefit from eMBMS services when certain bearer data paths of the core network 24 not present in the existing E2E bearer data path 30 are discovered to be capable of providing the eMBMS services.

Some embodiments may include providing a power measurement a pre-calculated weight and comparing it to a proposed service-driven E2E Bearer Data Path Modification. The proposed modification may consider the Quality of Service requirements and other network performance parameters or factors to ensure a more capable and better quality path for the running service. These parameters may have some pre-calculated weights to be considered in deciding an E2E Bearer Data Path Modification. A more optimal result of an E2E Bearer Data Path Modification decision may be obtained by calculating the weights of the parameters.

The wireless device 12 may trigger a bearer or session reassignment based on E2E parametric information. As a result, the wireless device 12 may choose the best cell, node, gateway or bearer candidate (corresponding to the full LTE/EPC path) depending on its needs at a particular time. This can ensure better quality paths for and better utilization of the services running on the wireless device 12. This may also reduce the impact of system overload and network congestion through making a more informed decision for E2E Bearer Data Path Modification. This can also avoid unwanted or useless handover decisions.

Figure 5:
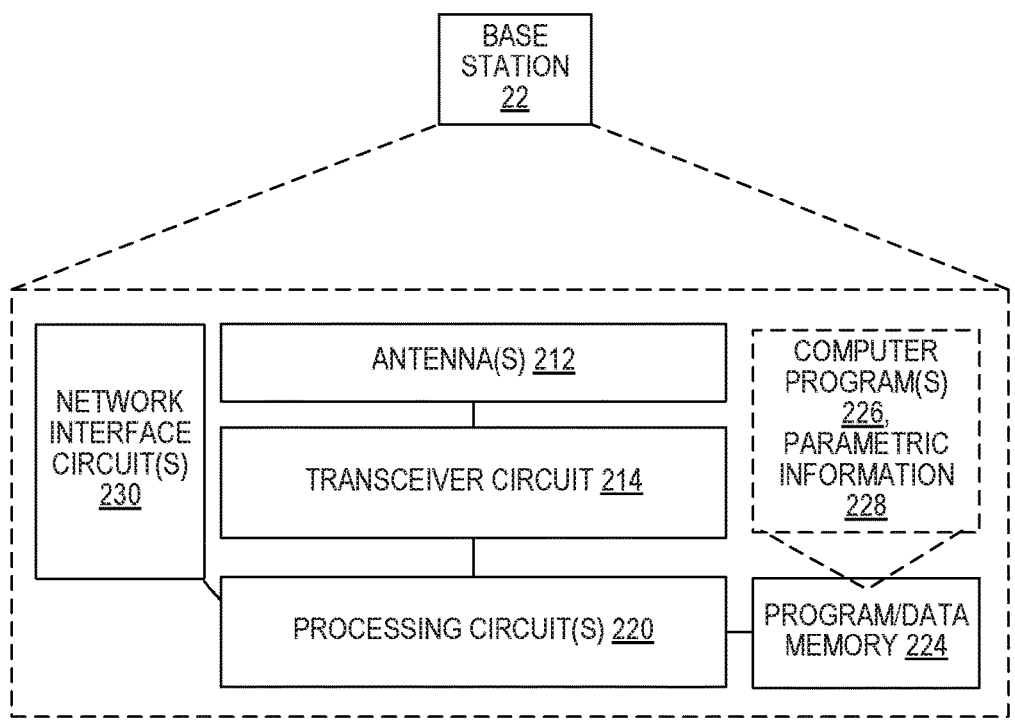
FIG. 5 is a block diagram of circuitry in a network node configured to modify an end-to-end bearer data path of communication, according to some embodiments.

The base station 22 is shown in further detail in FIG. 5, according to some embodiments. The bases station 22 of FIG. 5 is a representative of other network nodes in the communication network, such as the SGW 28, that may be capable of distributing parametric information and modifying the existing E2E bearer data path. The base station 22 has an air interface that includes one or more antennas 212 connected to a transceiver circuit 214. The transceiver circuit 214 include transmitter circuits, receiver circuits, and associated control circuits that are collectively configured to transmit and receive signals according to a radio access technology such as GSM, WCDMA, HSDPA, LTE, LTE-Advanced, etc., for the purposes of providing cellular communication services. For example, the base station 22 (like wireless device 12) includes one or more transceiver or radio interface circuits. The base station 22 may also include network interface circuits 230 for communicating with the core nodes 26, nodes of a WLAN network or other network nodes.

The base station 22 includes one or more processing circuits 220 that are operatively associated with the radio transceiver circuit 214. The processing circuit 220 is configured to collect and pass parametric information 228 and execute path modification requests received from the wireless device 12. The processing circuit 220 in this example is also associated with a memory 224. The memory 224, in some embodiments, stores one or more computer programs 226 and, optionally, configuration data. The memory 224 stores the parametric information 228. The memory 224 provides non-transitory storage for the computer program 226 and it may comprise disk storage, solid-state memory storage, or any mix thereof. By way of non-limiting example, the memory comprises any one or more of SRAM, DRAM, EEPROM, and FLASH memory. In general, the memory 224 comprises one or more types of computer-readable storage media providing non-transitory storage of the computer program 226 and any configuration data used by the base station 22. In turn, in at least some embodiments, the processing circuit 220 is configured to carry out smart E2E bearer data path modification as taught herein, based at least in part on the execution of computer program instructions.

In at least some embodiments, the processing circuit 220 comprises one or more digital processing circuits or circuitry as described in the example embodiments for the processing circuit 114 of the wireless device 12. Regardless of its specific implementation details, the processing circuit 220 of base station 22 is configured to perform a method, such as method 600 of FIG. 6, for modification of the existing E2E data path 30. The processing circuit 220 is configured to send parametric information identifying respective service capabilities of a plurality of network nodes in the core network 24 that are available for forming one or more alternate E2E bearer data paths of communication between the wireless device 12 and an endpoint, such as the PGW 14 (block 602 of FIG. 6). The processing circuit 220 is also configured to receive a request, from the wireless device 12, for a path modification of the existing E2E bearer data path 30 (block 604). The request comprises information corresponding to an alternate E2E bearer data path 40 having a more favorable service capability as compared to the existing E2E bearer data path 30. The processing circuit 220 is configured to request the path modification of the existing E2E bearer data path 30 based on the request from the wireless device 12 (block 606).

Figure 7:
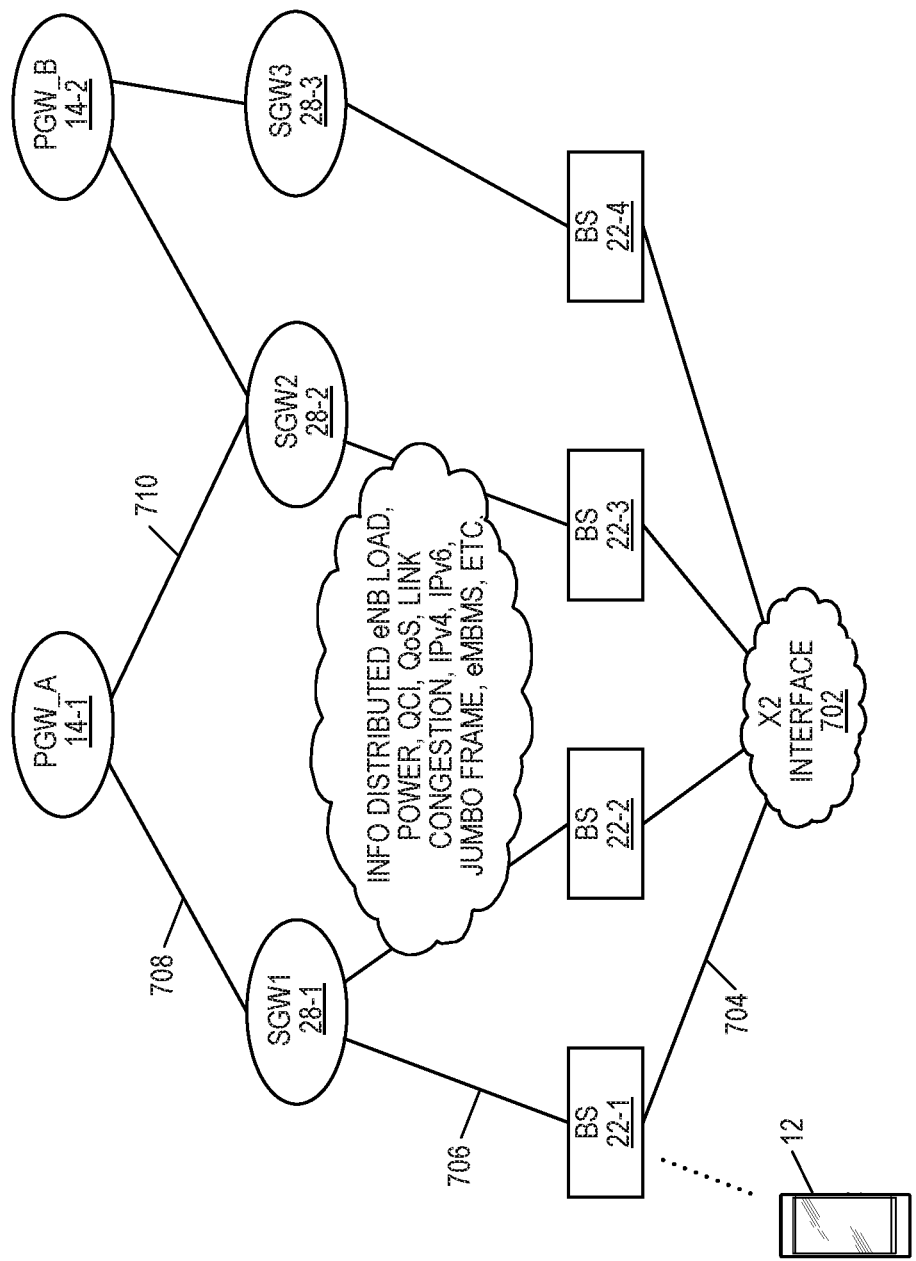
FIG. 7 is a diagram illustrating a distribution of information, including parametric information, according to some embodiments.

According to some embodiments, FIG. 7 shows a diagram of distributing information, including parametric information, between LTE nodes that would represent the network capabilities, functionalities and status of network nodes and/or bearers in the network. PGWs, such as the PGW_A 14-1 and the PGW_B 14-2, may have parametric information to pass on to other nodes. For example, the PGW_A 14-1 may pass on parametric information to the SGW1 28-1 and the SGW2 28-2 through communication paths 708 and 710. Parametric information for the PGW_A 14-1 and the SGW1 28-1 may then be passed to the BS 22-1 through the path 706. However, other base stations, such as the base stations 22-2, 22-3 and 22-may receive parametric information of other nodes, such as the PGW_B 14-2 and the SGW2 28-2 because the base station 22-3 shared this parametric information through the X2 interface 702 to the base station 22-1 over the communication path 704. The X2 interface 702 is used to inter-connect eNodeBs, such as base stations 22-1 to 22-4. It may be established between one base station and some of its neighbor base stations in order to exchange signaling information when needed. This distribution may make the base stations 22 "aware" of the whole network capabilities including for neighboring base stations. At some point each base station 22 may have a full overview of the LTE network, including capabilities of core nodes 26 in the core network 24, or will at least have such information for relevant subsets of the network—e.g., for tracking areas or other logical groupings of network nodes involving the geographic region(s) relevant to each base station 22.

Examples of shared parametric information are shown in Table 1 below, of course the parametric information shared among network nodes or provided to a given wireless device 12 may include only one or at least less than all of these types of parametric information.

TABLE 1

| Parameter: | Description | Involved Nodes |
|---|---|---|
| eNB load | The load level of all eNB nodes that the UE can relocate to. | At least a subset of eNBs in the network, e.g., at least those UEs that are candidates for serving the UE |
| IPv6 support | UE, PGW, IP NW capabilities of carrying IPv6 | UE, PGW, IP NW |
| Jumbo frame | UE, Air Interface, link between eNB, SIU, SGW, PGW | UE, Air Interface, link between eNB, SIU, SGW, PGW |
| eMBMS | eMBMS capability in the NW | UE, eNB, MME, SGW, PGW |
| QCI, QoS | Resource reservation at the nodes: eNB, SGW, PGW | eNB, SGW, PGW |

TABLE 1-continued

| Parameter: | Description | Involved Nodes |
|---|---|---|
| Core network node loading | Loading levels or other parametric information indicative of the node's ability to support new connections to it or through it | Gateways available for use as SGWs, PGWs, and any other entities in the core network used to make up or support bearer data paths within the core network |

The parametric information, indicating service capabilities of the nodes, is then provided to the wireless device 12. The wireless device 12 will use the provided information to determine whether there is an alternate E2E bearer data path that is more favorable than its existing E2E bearer data path 30 in terms of the service capabilities afforded by one or more of the core network nodes 26 available for such alternate E2E bearer data paths. If a more favorable path is available, the wireless device 12 makes the "best" E2E Bearer Data Path Modification decision for serving the wireless device 12 with better service than is currently provided to the wireless device 12. Here, "better" means that some aspect of the service is improved or made more robust as a consequence of the path modification, or that some added or enhanced capability is provided. Since this protocol achieves "network awareness" at the base stations 22, such a protocol may be referred to as a Network Awareness Protocol or NAP. Status information such as link congestion and signal strengths may also be evaluated in addition to the parametric information.

Figure 8:
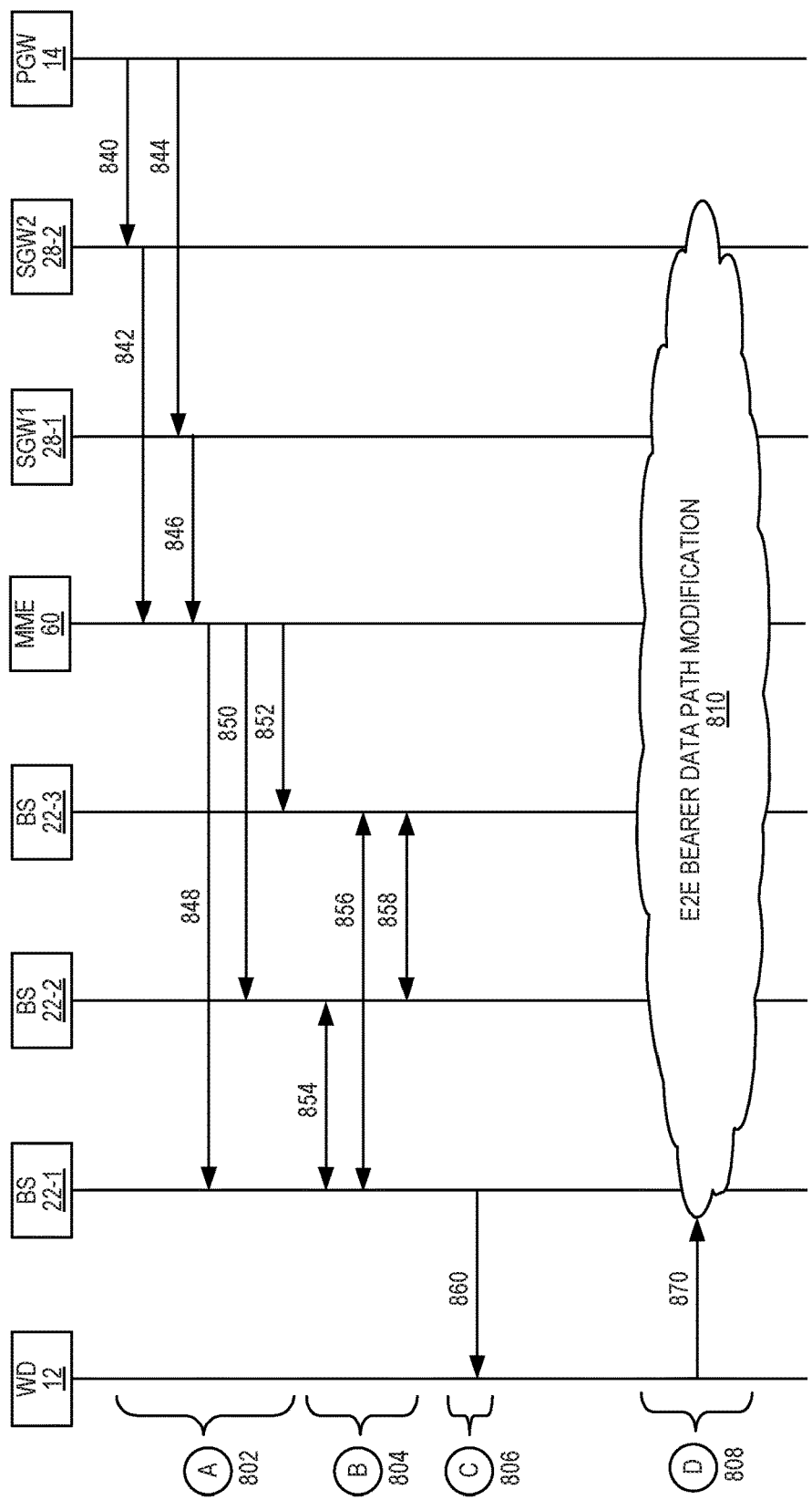
FIG. 8 is a diagram illustrating a distribution flow of parametric information, according to some embodiments.

FIG. 8 is diagram that shows a parametric information distribution flow between network nodes. Parametric information may include a network summary of node capabilities that will inform the wireless device 12 in its determination of alternate E2E bearer data paths. A protocol of distributing the parametric information can be described as follows:

Phase A (Information Distribution) 802: Parametric information about the PGW's 14 service capabilities (and maybe network status) are communicated in message 840 to the SGW_2 28-2 and in message 844 to the SGW_1 28-1. Parametric information for the SGW_2 28-2 and the PGW 14 may be communicated in message 842 to the MME 60, or directly to a base station 22. Parametric information for the SGW_1 28-1 (and the PGW 14) may be communicated in message 846 to the MME 60. The MME 60 forwards the parametric information to each of the base stations 22-1, 22-2 and 22-3 in messages 848, 850 and 852. The MME 60 may also add to the parametric information.

Phase B (Parametric Information) 804: In this phase, it is the base station's 22 responsibility to communicate the parametric information it has received and to add capability information about itself to the parametric information. The base stations 22-1, 22-2 and 22-3 may use the X2 interface 702 to share parametric information with each other, such as through X2 interface communications 854, 856 and 858. Network status information (e.g., congestion) may also be shared. At some point, each base station 22 will have full knowledge about the capabilities and status of all LTE nodes in the network. This would make each and every base station 22, or eNodeB, "aware" of the surrounding nodes.

Phase C (E2E Bearer Data Path Modification Decision) 806: In this phase, the base station 22-1 directly connected to the wireless device 12 will communicate the parametric information of each base station 22 for which the wireless device 12 could perform the E2E Bearer Data Path Modification. This can be communicated such as shown by communication 860. The wireless device 12 may have several records from all base stations 22 and could organize the information into a number of possible alternative paths. While checking the signal strength of all possible base stations, the wireless device 12 considers the parametric information learned from several base station records to ensure a better E2E Bearer Data Path Modification decision that suits the services running in the wireless device 12. A full awareness of the network nodes will help the wireless device 12 to select the most ideal E2E bearer data path, which may include staying with the existing E2E bearer data path or requesting a modification. This modification is in accordance with a selected alternate E2E bearer data path that may provide better capabilities or have a more favored network status to provide the required capabilities.

According to some embodiments, modification decisions include assigning values and weights to elements of a possible E2E bearer data path and selecting the alternative path based on these weighted values. Selections may also be made based on a comparison of the weighted values of a possible E2E bearer data path to the values assigned to the existing E2E bearer data path. For example, determining from parametric information that a more favorable E2E bearer data path includes assigning capability values to the respective service capabilities of network nodes, generating one or more candidate alternate E2E bearer data paths based on a comparison of the assigned capability values and service capabilities of the existing E2E bearer data path. Determining also includes selecting the more favorable E2E bearer data path from among the alternate E2E bearer data paths.

In some embodiments, the more favorable E2E bearer data path is selected based on a ranking of the more favorable E2E bearer data path or a path value of the more favorable E2E bearer data path satisfying a selection threshold value.

In other embodiments, determining includes assigning status values to bearer status information corresponding to the network nodes. Generating may include generating the alternate E2E bearer data paths based on a comparison of the assigned capability values, the assigned status values and the service capabilities of the existing E2E bearer data path.

Phase D (E2E Data Bearer Path Modification Execution) 808: This phase represents the actual execution of E2E Data Bearer path modification based on the decision made in Phase C 806. This modification is initiated by a request 870 for modification 810 issued by the wireless device 12.

Modification 810 may include a request for a change in S1 bearers, a change in S5/S8 bearers, a change in EPS bearers, a change in E-RAB bearers and/or a change in radio bearers. Modification 810 may also include a request for a different SGW 28-2 than the current SGW 28-1 handling communication for the existing E2E bearer data path.

Figure 9:
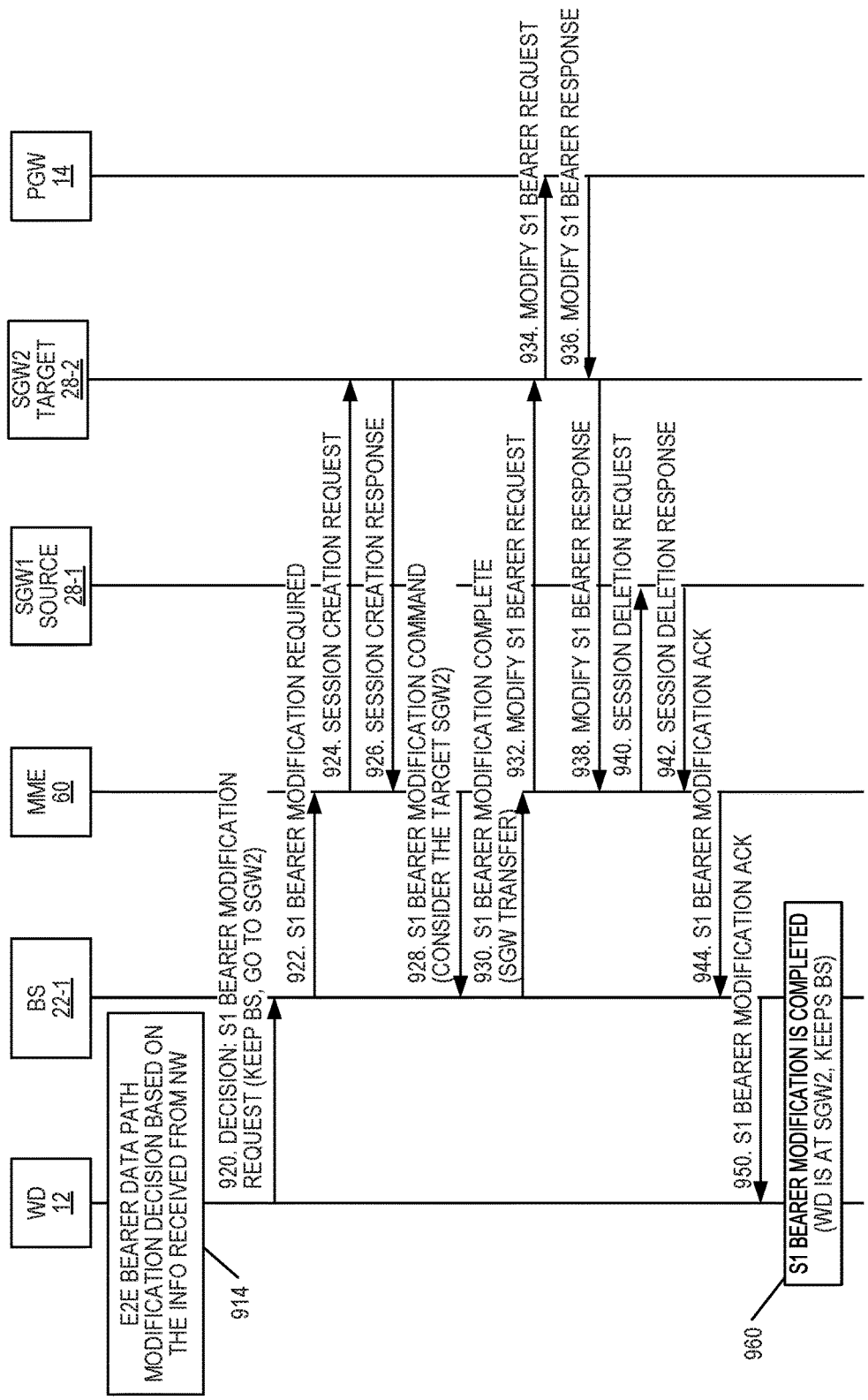
FIG. 9 shows a diagram of an example of end-to-end bearer data modification, according to some embodiments.

A first example of E2E bearer path modification 810 in Phase D of FIG. 8 includes a change of an S1 bearer from one SGW 28-1 to another SGW 28-2. This makes a change in the core network 24 at the request of a wireless device 12. FIG. 9 is a flow diagram showing an S1 bearer change from the Source SGW1 28-1 to the Target SGW2 28-2, according to some embodiments. The wireless device 12 makes an E2E Bearer Data Path Modification Decision (block 914) based on the parametric information received from one or more base stations 22 about node capabilities in the network, including for core nodes 26 in the core network 24. Based on the decision 914, the wireless device 12 makes an S1 bearer modification request (communication 920). Specifically, the wireless device 12 requests that the bearer change from the source SGW1 28-1 to the target SGW2 28-2.

The request (comm 920) from the wireless device 12 goes to the base station 22-1. The MME 60 is notified that S1 bearer modification is required (comm 922). A session creation request (comm 924) from the MME 60 receives a response (comm 926) from the target SGW2 28-2. An S1 bearer modification command (comm 928) from the MME 60 to the base station 22-1 considers the target SGW2 28-2. The base station 22-1 notifies the MME 60 that the S1 bearer modification is complete for SGW transfer (comm 930). A modify S1 bearer request (comm 932) is sent from the MME 60 to the SGW2 28-2, which sends a modify S1 bearer request (comm 934) to the PGW 14. The PGW 14 sends a modify S1 bearer response (comm 936) back to the SGW2 28-2, which sends a modify S1 bearer response (comm 938) to the MME 60.

Now a session deletion request (comm 940) is sent from the MME 60 to the source SGW1 28-1, which responds (comm 942) to the MME 60. An S1 bearer modification acknowledgement (comm 944) is sent from the MME 60 to the base station 22-1, and an S1 bearer modification acknowledgement (comm 950) is sent from the base station 22-1 to the wireless device 12. The S1 bearer modification is completed. The wireless device 12 maintains a bearer to the base station 22-1 but now utilizes a new bearer to the SGW2 28-2 (block 960).

Figure 10A:
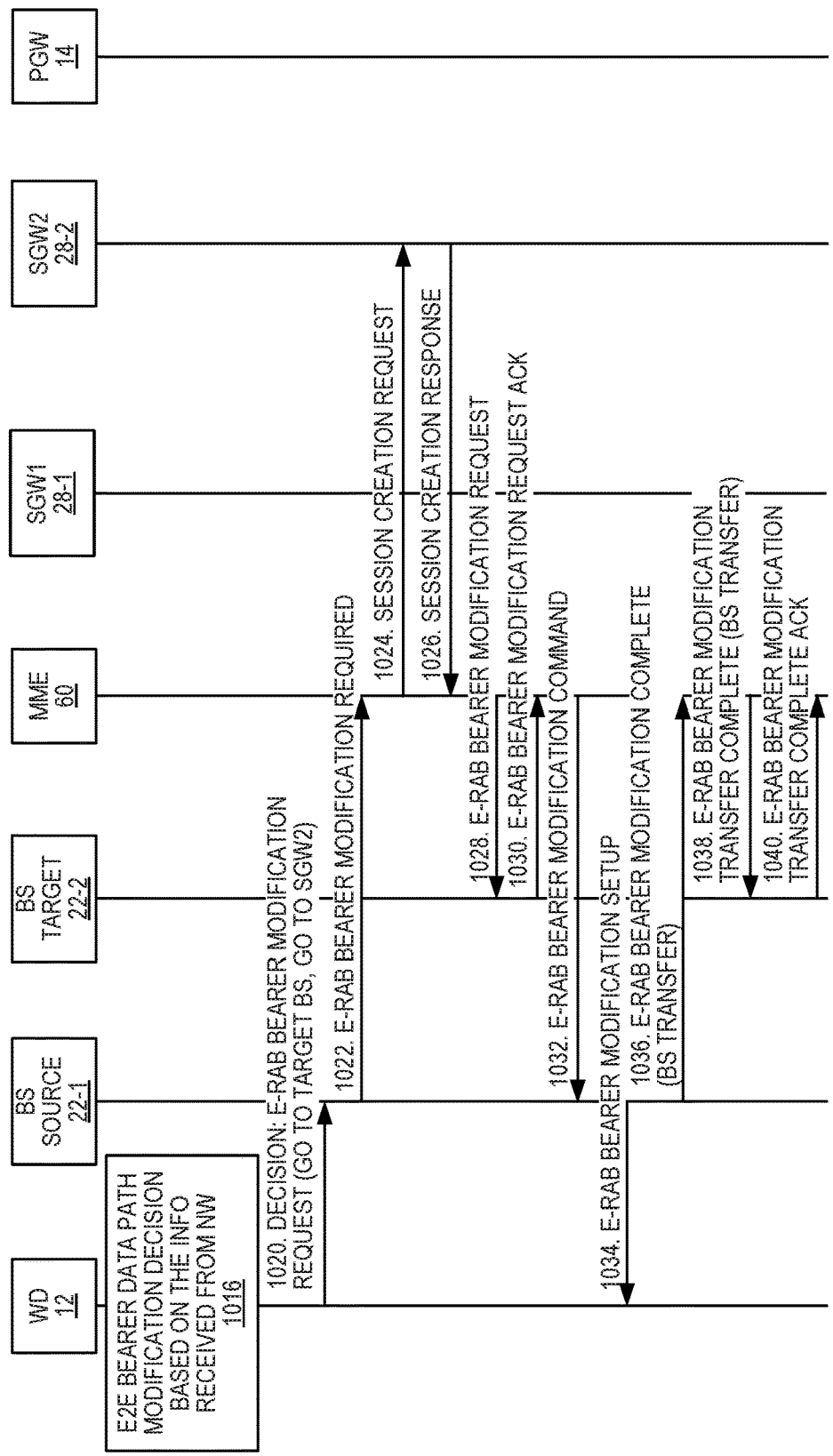
FIGS. 10A-10B show diagrams of another example of end-to-end bearer data modification, according to some embodiments.
Figure 10B:
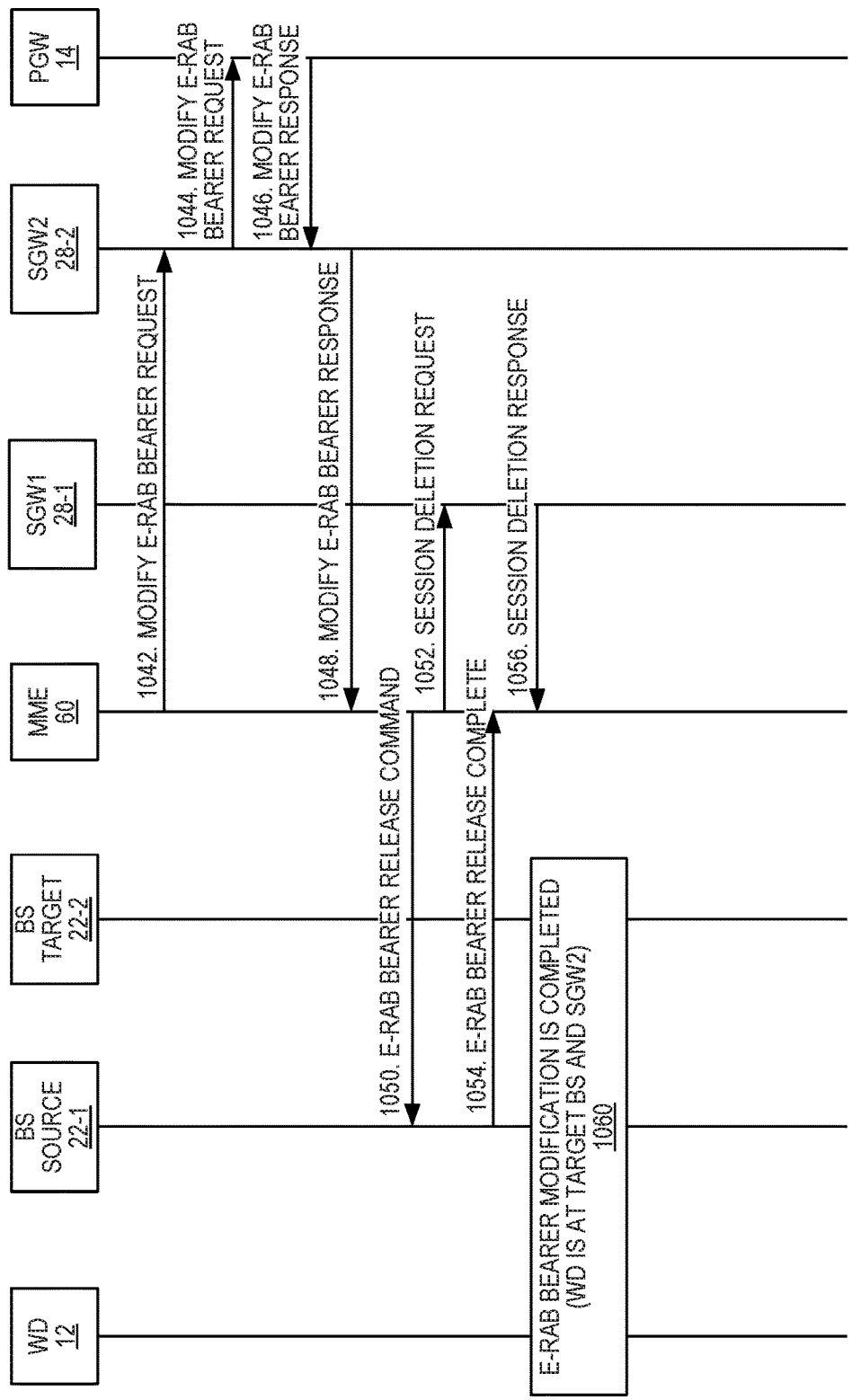

In a second example, the E2E bearer path modification 810 includes a change of an E-RAB bearer. As shown in FIG. 2, E-RAB bearer 226 proceeds from wireless device 12 to the SGW 28. Therefore, in this example, the modification 810 modifies or reconfigures the existing E2E bearer data path 30 from one base station 22-1 and SGW 28-1 to another base station 22-2 and another SGW 28-2. This involves a change at the access network 18 and in the core network 24. FIGS. 10A-10B illustrate a flow diagram showing an E-RAB bearer change from the source base station 22-1 and the source SGW1 28-1 to the target base station 22-2 and the target SGW2 28-2.

In FIG. 10A, the wireless device 12 makes an E2E Bearer Data Path Modification Decision (block 1016) based on the parametric information received from the communication network 10, including for core nodes 26 in the core network 24. Based on decision 1016, the wireless device 12 makes an E-RAB bearer modification request 1020. Specifically, the wireless device 12 requests that the E2E bearer data path 30 change bearers from the source base station 22-1 and the source SGW1 28-1 to the target base station 22-2 and the target SGW2 28-2.

A request (comm 1020) from the wireless device 12 goes to the source base station 22-1. The MME 60 is notified that E-RAB bearer modification is required (comm 1022). A session creation request (comm 1024) from the MME 60 receives a response (comm 1026) from the target SGW2 28-2. An E-RAB bearer modification request (comm 1028) is sent from the MME 60 to the target base station 22-2, which provides a request acknowledgement (comm 1030).

An E-RAB bearer modification command (comm 1032) is sent from the MME 60 to the source base station 22-1. The source base station 22-1 sends an E-RAB bearer modification setup message (comm 1034) to the wireless device 12. The source base station 22-1 also notifies the MME 60 that the E-RAB bearer modification is complete for base station transfer (comm. 1036). The MME 60 sends an E-RAB bearer modification transfer complete message for base station transfer (comm 1038) to the target base station 22-2, which sends back an E-RAB bearer modification transfer complete acknowledgement (comm 1040).

Continuing with FIG. 10B, a modify E-RAB bearer request (comm 1042) is sent from the MME 60 to the target SGW2 28-2, which sends a modify E-RAB bearer request (comm 1044) to the PGW 14. The PGW 14 sends a modify E-RAB bearer response (comm 1046) back to the target SGW2 28-2, which sends a modify E-RAB bearer response (comm 1048) to the MME 60.

An E-RAB release command is sent from the MME 60 to the source base station 22-1 (comm 1050). A session deletion request (comm 1052) is sent from the MME 60 to the source SGW1 28-1. An E-RAB release complete indication is sent from the source base station 22-1 to the MME 60 (comm 1054). The source SGW1 28-1 sends a session deletion response to the MME 60 (comm 1056). The E-RAB bearer modification is completed and the wireless device 12 is now provided communication service through the target base station 22-2 and the target SGW 2 28-2 (block 1060). This may result in a better network status while maintaining or newly utilizing service capabilities of the new E2E bearer data path.

In another example, modification 810 includes changing other elements of the core network 24. An endpoint in the core network may be PGW 14. In this example, the modification 810 includes requesting a different PGW than a current PGW 14 handling communication for the existing E2E bearer data path 30.

FIG. 11 illustrates a method 1100 of modifying an existing E2E bearer data path 30 of communication between a wireless device 12 and an endpoint 14 in a core network 24, according to some embodiments. The core network 24 includes core nodes 26 that are available for forming alternate E2E bearer data paths of communication between the wireless device 12 and the endpoint 14. Parametric information is distributed through the network to the wireless device 12 and an existing E2E bearer data path 30 is modified based on a request from the wireless device 12. At block 1102, network nodes are configured to distribute parametric information identifying respective service capabilities of core nodes 26 in the core network 24 to other access nodes 20 and core nodes 26.

The wireless device 12 is configured to receive the parametric information and determine from the parametric information that the more favorable E2E bearer data path of communication between the wireless device 12 and the endpoint 14, such as E2E bearer data path 40, is available (block 1104). The more favorable E2E bearer data path 40 involves has a more favorable service capability than the existing E2E bearer data path 30. The more favorable E2E bearer data path 40 may involve network nodes and/or bearers having a more favorable service capability as compared to corresponding network nodes and/or bearers in the existing E2E bearer data path 30. The wireless device 12 is configured to request the path modification to change from the existing E2E bearer data path 30 to the more favorable E2E bearer data path 40 (block 1106). In further embodiments, the access nodes 20 and the core nodes 26 are configured to modify or reconfigure the existing E2E bearer data path 30 in the core network 24 based on a more favorable E2E bearer data path 40 (block 1108).

Figure 12:
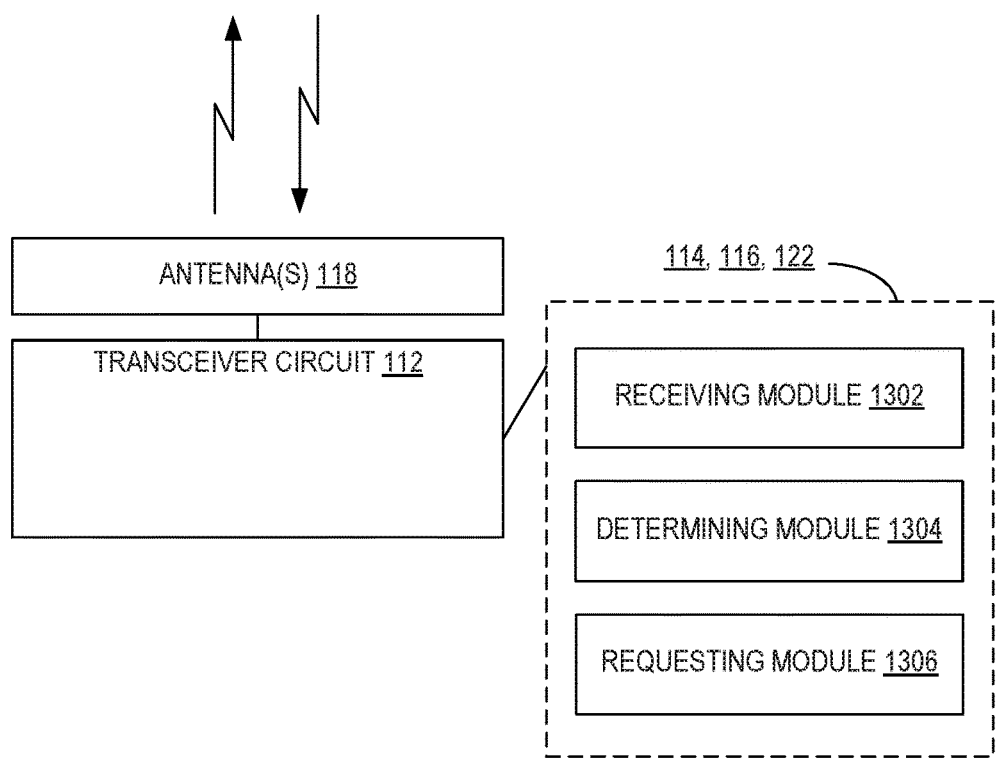
FIG. 12 is a block diagram of a wireless device configured to modify an end-to-end bearer data path of communication between the wireless device and an endpoint in a core network, according to some embodiments.

FIG. 12 illustrates an example functional module or circuit architecture as may be implemented in a wireless device 12, such as a UE in an LTE network, based on the processing circuit 114 executing computer program instructions included in the computer program 122 stored in the storage memory 116. The illustrated embodiment includes a receiving module 1202 for receiving parametric information identifying respective service capabilities of network nodes in the core network 24, such as core nodes 26, that are available via transceiver circuit 112 for forming alternate E2E bearer data paths of communication between the wireless device 12 and the endpoint 14. The embodiment also includes a determining module 1204 for determining from the parametric information that a more favorable E2E bearer data path of communication between the wireless device 12 and the endpoint 14 is available. The more favorable E2E bearer data path has a more favorable service capability as compared to the existing E2E bearer data path. The embodiment also includes a requesting module 1206 for requesting a path modification from the existing E2E bearer data path to the more favorable E2E bearer data path.

Figure 13:
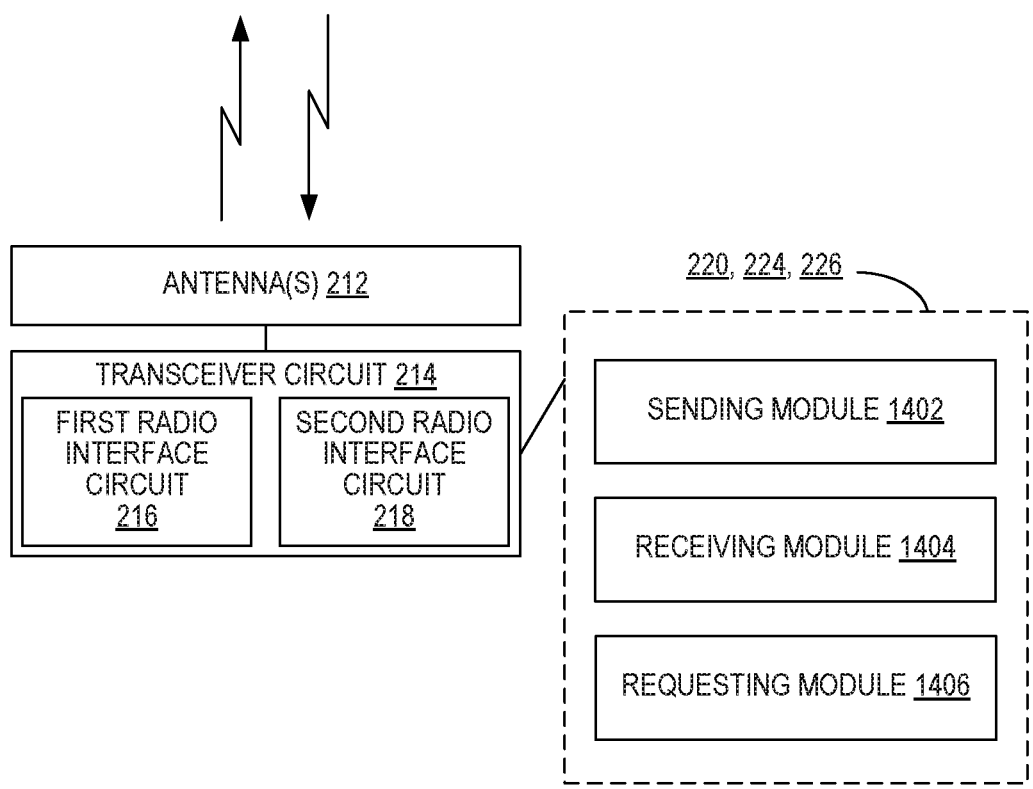
FIG. 13 is a block diagram of a network node configured to modify an end-to-end bearer data path of communication between a wireless device and an endpoint in a core network, according to some embodiments.

FIG. 13 illustrates an example functional module or circuit architecture as may be implemented in a network node, such as in a base station 22-1 or an eNodeB of an LTE network, based on the processing circuit 220 executing computer program instructions included in the computer program 226 stored in the storage memory 224. The illustrated embodiment includes a sending module 1302 for sending, by a network node (e.g., base station 22-1) to a wireless device 12, parametric information identifying respective service capabilities of a plurality of network nodes in the core network 24 that are available for forming alternate E2E bearer data paths of communication between the wireless device 12 and the endpoint 14. The embodiment also includes a receiving module 1304 for receiving a request, from the wireless device 12, for a path reconfiguration of the existing E2E bearer data path. The request includes information corresponding to an alternate E2E bearer data path having a more favorable service capability as compared to the existing E2E bearer data path. The embodiment also includes a requesting module 1306 for requesting the path modification of the existing E2E bearer data path based on the request from the wireless device 12.

Embodiments of the present disclosure include methods and network devices for modifying an existing E2E bearer data path of communication between a wireless device and an endpoint in a core network. The embodiments provide advantages over existing path modification methods, including providing a capability for a wireless device, such as a UE in an LTE network, to change radio cell, base station and core network nodes based on the required services or network capabilities of the wireless device rather than solely on signal power. In contrast to conventional methods, the wireless device may become more aware of network capabilities through a distribution of information about the capabilities of the network nodes through the network and to the wireless device. The wireless device can evaluate multiple parameters to select a handover, node change, bearer change, session transfer or other modification event to obtain or improve the wireless device's ability to utilize network capabilities in the core network. The wireless device may then request an E2E bearer data path modification to better utilize network capabilities. This may include modifying the end-to-end bearer data path by changing bearers in the core network.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method at a wireless device of modifying an existing end-to-end bearer data path of communication between the wireless device and an endpoint in a core network, comprising:
receiving parametric information identifying respective service capabilities of a plurality of network nodes in the core network that are available for forming one or more alternate end-to-end bearer data paths of communication between the wireless device and the endpoint;
determining from the parametric information that a more favorable end-to-end bearer data path of communication between the wireless device and the endpoint is available, said more favorable end-to-end bearer data path having a more favorable service capability in the core network as compared to the existing end-to-end bearer data path,
wherein determining that the more favorable end-to-end bearer data path is available comprises, at the wireless device:
assigning capability values to the respective service capabilities of ones of the plurality of network nodes;
generating a plurality of candidate alternate end-to-end bearer data paths based on a comparison of the assigned capability values and service capabilities of the existing end-to-end bearer data path; and
selecting the more favorable end-to-end bearer data path from among the plurality of candidate alternate end-to-end bearer data paths; and
requesting a path modification from the existing end-to-end bearer data path to the more favorable end-to-end bearer data path.

2. The method of claim 1, wherein receiving the parametric information comprises sending, to a network node, a request for the parametric information.

3. The method of claim 1, wherein requesting the path modification comprises requesting at least one of the following: a change in S1 bearers, a change in S5/S8 bearers, a change in Evolved Packet System (EPS) bearers, a change in Enhanced Radio Access Bearers (E-RAB), and a change in radio bearers.

4. The method of claim 1, wherein requesting the path modification comprises requesting a different serving gateway (SGW) than a current SGW handling communication for the existing end-to-end bearer data path.

5. The method of claim 1, wherein receiving the parametric information comprises receiving the parametric information in a format defined according to a network awareness protocol for specifying bearer capability.

6. The method of claim 1, wherein the endpoint in the core network is a packet data network gateway (PGW).

7. The method of claim 6, wherein requesting the path modification comprises requesting a different PGW than a current PGW handling communication for the existing end-to-end bearer data path.

8. The method of claim 1, wherein selecting the more favorable end-to-end bearer data path comprises selecting the more favorable end-to-end bearer data path based on at least one of a ranking of the more favorable end-to-end bearer data path and a path value of the more favorable end-to-end bearer data path satisfying a selection threshold value.

9. The method of claim 1, wherein determining that the more favorable end-to-end bearer data path is available further comprises assigning status values to bearer status information corresponding to the ones of the plurality of network nodes, and wherein generating the plurality of candidate alternate end-to-end bearer data paths comprises generating the plurality of candidate alternate end-to-end bearer data paths based on a comparison of the assigned capability values, the assigned status values, and the service capabilities of the existing end-to-end bearer data path.

10. A wireless device configured to modify an existing end-to-end bearer data path of communication between the wireless device and an endpoint in a core network, comprising:
 a transceiver circuit configured to transmit and receive wireless signals; and
 a processing circuit operatively connected to the transceiver circuit and configured to:
  receive parametric information identifying respective service capabilities of a plurality of network nodes in the core network that are available for forming one or more alternate end-to-end bearer data paths of communication between the wireless device and the endpoint;
  determine from the parametric information that a more favorable end-to-end bearer data path of communication between the wireless device and the endpoint is available, said more favorable end-to-end bearer data path having a more favorable service capability in the core network as compared to the existing end-to-end bearer data path,
  wherein the processing circuit is further configured to:
   assign capability values to the respective service capabilities of ones of the plurality of network nodes;
   generate a plurality of candidate alternate end-to-end bearer data paths based on a comparison of the assigned capability values and service capabilities of the existing end-to-end bearer data path; and
   select the more favorable end-to-end bearer data path from among the plurality of candidate alternate end-to-end bearer data paths; and
  request a path modification from the existing end-to-end bearer data path to the more favorable end-to-end bearer data path.

11. The wireless device of claim 10, wherein the processing circuit is configured to send, to a network node, a request for the parametric information.

12. The wireless device of claim 10, wherein the processing circuit is configured to request at least one of the following: a change in S1 bearers, a change in S5/S8 bearers, a change in Evolved Packet System (EPS) bearers, a change in Enhanced Radio Access Bearers (E-RAB), and a change in radio bearers.

13. The wireless device of claim 10, wherein the processing circuit is configured to request a different serving gateway (SGW) than a current SGW handling communication for the existing end-to-end bearer data path.

14. The wireless device of claim 10, wherein the processing circuit is configured to receive the parametric information in a format defined according to a network awareness protocol for specifying bearer data capability.

15. The wireless device of claim 10, wherein the endpoint in the core network is a packet data network gateway (PGW).

16. The wireless device of claim 15, wherein the processing circuit is configured to request a different PGW than a current PGW handling communication for the existing end-to-end bearer data path.

17. The wireless device of claim 1, wherein the processing circuit is configured to select the more favorable end-to-end bearer data path based on at least one of a ranking of the more favorable end-to-end bearer data path and a path value of the more favorable end-to-end bearer data path satisfying a selection threshold value.

18. The wireless device of claim 10, wherein the processing circuit is configured to:
 assign status values to bearer status information corresponding to the ones of the plurality of network nodes; and
 generate the plurality of candidate alternate end-to-end bearer data paths based on a comparison of the assigned capability values, the assigned status values, and the service capabilities of the existing end-to-end bearer data path.

19. A method of modifying an existing end-to-end bearer data path of communication between a wireless device and an endpoint in a core network, comprising:
 sending, by a network node to the wireless device, parametric information identifying respective service capabilities of a plurality of network nodes in the core network that are available for forming one or more alternate end-to-end bearer data paths of communication between the wireless device and the endpoint;
 receiving a request, from the wireless device, for a path modification of the existing end-to-end bearer data path, wherein the request comprises information corresponding to an alternate end-to-end bearer data path having a more favorable service capability in the core network as compared to the existing end-to-end bearer data path,
 wherein the request from the wireless device comprises:
  assigning capability values to the respective service capabilities of ones of the plurality of network nodes;
  generating a plurality of candidate alternate end-to-end bearer data paths based on a comparison of the assigned capability values and service capabilities of the existing end-to-end bearer data path; and
  selecting the more favorable end-to-end bearer data path from among the plurality of candidate alternate end-to-end bearer data paths; and
 requesting modification of the existing end-to-end bearer data path based on the request from the wireless device.

20. A network node configured to modify an existing end-to-end bearer data path of communication between a wireless device and an endpoint in a core network, comprising:
 a processing circuit configured to:
  send parametric information identifying respective service capabilities of a plurality of network nodes in the core network that are available for forming one or more alternate end-to-end bearer data paths of communication between the wireless device and the endpoint;
receive a request, from the wireless device, for a path modification of the existing end-to-end bearer data path, wherein the request comprises information corresponding to an alternate end-to-end bearer data path having a more favorable service capability in the core network as compared to the existing end-to-end bearer data path,
wherein the request of the wireless device comprises:
a request to assign capability values to the respective service capabilities of ones of the plurality of network nodes;
a request to generate a plurality of candidate alternate end-to-end bearer data paths based on a comparison of the assigned capability values and service capabilities of the existing end-to-end bearer data path; and
a request to select the more favorable end-to-end bearer data path from among the plurality of candidate alternate end-to-end bearer data paths; and
request modification of the existing end-to-end bearer data path based on the request from the wireless device.

21. A method of modifying an existing end-to-end bearer data path of communication between a wireless device and an endpoint in a core network, comprising:
distributing, by a plurality of network nodes that are available for forming one or more alternate end-to-end bearer data paths of communication between the wireless device and the endpoint, parametric information identifying respective service capabilities of ones of the plurality of network nodes in the core network;
determining, by the wireless device, from the parametric information that a more favorable end-to-end bearer data path of communication between the wireless device and the endpoint is available, said more favorable end-to-end bearer data path having a more favorable service capability in the core network as compared to the existing end-to-end bearer data path,
wherein determining that the more favorable end-to-end bearer data path is available comprises, at the wireless device:
assigning capability values to the respective service capabilities of ones of the plurality of network nodes;
generating a plurality of candidate alternate end-to-end bearer data paths based on a comparison of the assigned capability values and service capabilities of the existing end-to-end bearer data path; and
selecting the more favorable end-to-end bearer data path from among the plurality of candidate alternate end-to-end bearer data paths;
requesting, by the wireless device, a modification from the existing end-to-end bearer data path to the more favorable end-to-end bearer data path; and
modifying the existing end-to-end bearer data path in the core network based on the more favorable end-to-end bearer data path.

22. A communication system configured to modify an existing end-to-end bearer data path of communication between a wireless device and an endpoint in a core network, comprising:
a plurality of network nodes that are available for forming one or more alternate end-to-end bearer data paths of communication between the wireless device and the endpoint, said plurality of network nodes configured to distribute parametric information identifying respective service capabilities of ones of the plurality of network nodes in the core network to other ones of the plurality of network nodes, and wherein the plurality of network nodes are configured to modify the existing end-to-end bearer data path in the core network based on a more favorable end-to-end bearer data path; and
the wireless device configured to:
receive the parametric information;
determine from the parametric information that the more favorable end-to-end bearer data path of communication between the wireless device and the endpoint is available, said more favorable end-to-end bearer data path having a more favorable service capability in the core network as compared to the existing end-to-end bearer data path,
wherein determining that the more favorable end-to-end bearer data path is available comprises, at the wireless device:
assigning capability values to the respective service capabilities of ones of the plurality of network nodes;
generating a plurality of candidate alternate end-to-end bearer data paths based on a comparison of the assigned capability values and service capabilities of the existing end-to-end bearer data path; and
selecting the more favorable end-to-end bearer data path from among the plurality of candidate alternate end-to-end bearer data paths; and
request a modification to change from the existing end-to-end bearer data path to the more favorable end-to-end bearer data path,
wherein the plurality of network nodes are configured to modify the existing end-to-end bearer data path in the core network based on the more favorable end-to-end bearer data path.

23. A non-transitory computer readable storage medium storing a computer program comprising program instructions which, when executed on at least one processor of a wireless device, configure the wireless device to modify an existing end-to-end bearer data path of communication between the wireless device and an endpoint in a core network, based on causing the at least one processor to perform operations to control the wireless device to:
receive parametric information identifying respective service capabilities of a plurality of network nodes in the core network that are available for forming one or more alternate end-to-end bearer data paths of communication between the wireless device and the endpoint;
determine from the parametric information that a more favorable end-to-end bearer data path of communication between the wireless device and the endpoint is available, said more favorable end-to-end bearer data path having a more favorable service capability in the core network as compared to the existing end-to-end bearer data path,
wherein determining that the more favorable end-to-end bearer data path is available comprises, at the wireless device:
assigning capability values to the respective service capabilities of ones of the plurality of network nodes;
generating a plurality of candidate alternate end-to-end bearer data paths based on a comparison of the assigned capability values and service capabilities of the existing end-to-end bearer data path; and selecting the more favorable end-to-end bearer data path from among the plurality of candidate alternate end-to-end bearer data paths; and request a path modification from the existing end-to-end bearer data path to the more favorable end-to-end bearer data path.

24. A non-transitory computer readable storage medium storing a computer program comprising program instructions which, when executed on at least one processor, cause the at least one processor to perform operations to control a network node to:

send parametric information identifying respective service capabilities of a plurality of network nodes in a core network that are available for forming one or more alternate end-to-end bearer data paths of communication between a wireless device and an endpoint in the core network;

receive a request, from the wireless device, for a path modification of an existing end-to-end bearer data path, wherein the request comprises information corresponding to an alternate end-to-end bearer data path having a more favorable service capability in the core network as compared to the existing end-to-end bearer data path, wherein determining that the more favorable end-to-end bearer data path is available comprises, at the wireless device:

assigning capability values to the respective service capabilities of ones of the plurality of network nodes;

generating a plurality of candidate alternate end-to-end bearer data paths based on a comparison of the assigned capability values and service capabilities of the existing end-to-end bearer data path; and selecting the more favorable end-to-end bearer data path from among the plurality of candidate alternate end-to-end bearer data paths; and request the path modification of the existing end-to-end bearer data path based on the request from the wireless device.

* * * * *